(12) United States Patent
Wilhelm et al.

(10) Patent No.: US 12,491,412 B2
(45) Date of Patent: Dec. 9, 2025

(54) INFLATABLE BALL

(71) Applicant: Doskocil Manufacturing Company, Inc., Arlington, TX (US)

(72) Inventors: Josiah Wilhelm, Arlington, TX (US); Ron Bagley, Arlington, TX (US); Chris Wilson, Arlington, TX (US)

(73) Assignee: Doskocil Manufacturing Company, Inc., Arlington, TX (US)

( * ) Notice: Subject to any disclaimer, the term of this patent is extended or adjusted under 35 U.S.C. 154(b) by 0 days.

(21) Appl. No.: 18/203,996

(22) Filed: May 31, 2023

(65) Prior Publication Data

US 2024/0315202 A1    Sep. 26, 2024

Related U.S. Application Data

(60) Provisional application No. 63/453,661, filed on Mar. 21, 2023.

(51) Int. Cl.
| | | |
|---|---|---|
| *A63B 45/00* | (2006.01) | |
| *A01K 15/02* | (2006.01) | |
| *A63B 41/10* | (2006.01) | |

(52) U.S. Cl.
CPC ............. *A63B 45/00* (2013.01); *A63B 41/10* (2013.01); *A01K 15/026* (2013.01)

(58) Field of Classification Search
CPC ............. A01K 15/026; A01K 15/025; A63B 2208/14; A63B 43/00; A63B 45/00; A63B 41/08; A63B 2243/0025; A63B 41/02; A63B 41/10; A63B 41/00; A63B 39/06; A63B 37/12; A63B 37/02

USPC .......... D30/160; 119/709, 707, 702
See application file for complete search history.

(56) References Cited

U.S. PATENT DOCUMENTS

| | | | | |
|---|---|---|---|---|
| 5,096,756 A | * | 3/1992 | Walters ................. | C08L 27/06 473/610 |
| 5,681,233 A | * | 10/1997 | Guenther ............... | A63B 41/00 473/604 |
| 6,726,582 B1 | * | 4/2004 | Kuo ....................... | A63B 41/08 473/604 |
| 7,247,107 B1 | * | 7/2007 | Bedwell ................. | A63B 37/12 473/595 |
| 8,777,787 B2 | | 7/2014 | Raynak et al. | |
| 11,904,212 B2 | * | 2/2024 | Campbell .............. | A63B 43/00 |
| 2002/0098928 A1 | * | 7/2002 | Ou ........................ | A63B 41/08 473/604 |

(Continued)

FOREIGN PATENT DOCUMENTS

| | | | | | |
|---|---|---|---|---|---|
| CN | 106880929 A | * | 6/2017 | ............ | A63B 41/00 |
| CN | 218793780 U | * | 4/2023 | | |

(Continued)

OTHER PUBLICATIONS

International Search Report issued Jul. 11, 2024 in corresponding International Application No. PCT/US2024/020768.

*Primary Examiner* — Morgan T Jordan
(74) *Attorney, Agent, or Firm* — Foley & Lardner LLP

(57) ABSTRACT

An inflatable ball includes an inner layer, an intermediate layer and an outer layer. The inner layer has an inflatable bladder for storing air. The intermediate layer is provided over the inner layer, the intermediate layer including ethylene vinyl acetate. The outer layer is provided over the intermediate layer. The outer layer includes rubber.

19 Claims, 6 Drawing Sheets

(56) References Cited

U.S. PATENT DOCUMENTS

| | | | |
|---|---|---|---|
| 2003/0228946 A1* | 12/2003 | Chan | A63B 41/00 473/604 |
| 2004/0087396 A1* | 5/2004 | Chan | A63B 45/00 473/605 |
| 2004/0110582 A1* | 6/2004 | Kennedy, III | A63B 41/00 473/593 |
| 2004/0213984 A1* | 10/2004 | Avis | A63B 41/08 428/72 |
| 2006/0148601 A1* | 7/2006 | Ou | A63B 41/10 473/603 |
| 2008/0188333 A1* | 8/2008 | Tsai | A63B 41/02 473/604 |
| 2008/0188334 A1 | 8/2008 | Feeney et al. | |
| 2009/0209374 A1* | 8/2009 | Ou | B29C 35/0227 264/236 |
| 2012/0202627 A1* | 8/2012 | Raynak | A63B 45/00 473/604 |
| 2013/0035182 A1* | 2/2013 | Sing | A63B 41/08 473/605 |
| 2016/0346627 A1* | 12/2016 | Le | B29D 22/04 |
| 2017/0173405 A1* | 6/2017 | McNamee | A63B 41/08 |
| 2017/0203161 A1* | 7/2017 | Ahsan | A63B 41/08 |
| 2020/0298064 A1* | 9/2020 | Hare | A63B 41/02 |
| 2021/0093930 A1* | 4/2021 | Shi | B29C 41/04 |

FOREIGN PATENT DOCUMENTS

| | | | | |
|---|---|---|---|---|
| FR | 2914195 A1 * | 10/2008 | | A63B 41/00 |
| WO | 2009065302 A1 | 5/2009 | | |
| WO | WO-2014172809 A1 * | 10/2014 | | B29C 41/04 |

\* cited by examiner

INFLATABLE BALL

CROSS-REFERENCE TO RELATED APPLICATIONS

This application claims priority to Provisional U.S. Patent Application No. 63/453,661, filed on Mar. 21, 2023. The entire disclosure of Provisional U.S. Patent Application No. 63/453,661 is hereby incorporated by reference.

BACKGROUND

Technical Field

The present disclosure generally relates to an inflatable ball. More specifically, the present disclosure relates to an inflatable ball having multiple layers.

Background Information

An inflatable ball can be considered "anti-burst" or "burst-resistant," meaning the inner layer would deflate if punctured but not explode. In this way, the inflatable ball can maintain its inflated shape not by the air pressure filled inside the bladder but due to the rigidity and elasticity of the PVC. The inflatable ball can withstand semipermanent use without requiring much care. As stated, the inner layer can be made of foamed polyvinyl chloride to have suitable flexibility. Therefore, the inflatable ball can absorb impact and not cause injury to a pet during engagement.

SUMMARY

In view of the state of the known technology, one aspect of the present disclosure is to provide an inflatable ball comprising an inner layer, an intermediate layer and an outer layer. The inner layer has an inflatable bladder for storing air. The intermediate layer is provided over the inner layer, the intermediate layer including ethylene vinyl acetate. The outer layer is provided over the intermediate layer. The outer layer includes rubber.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
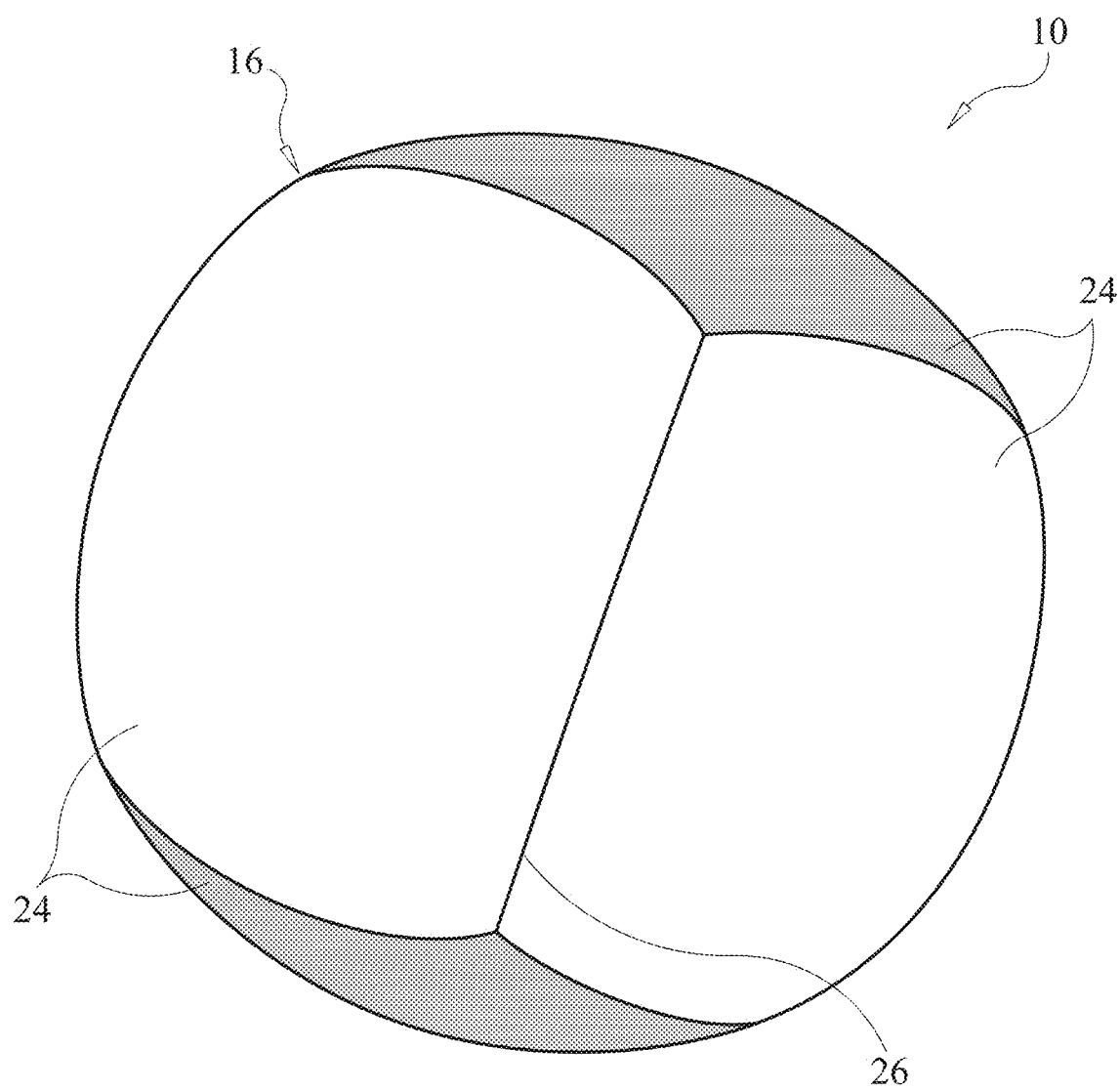
FIG. 1 is a plan view of an inflatable ball in accordance with an illustrated embodiment.
Figure 2:
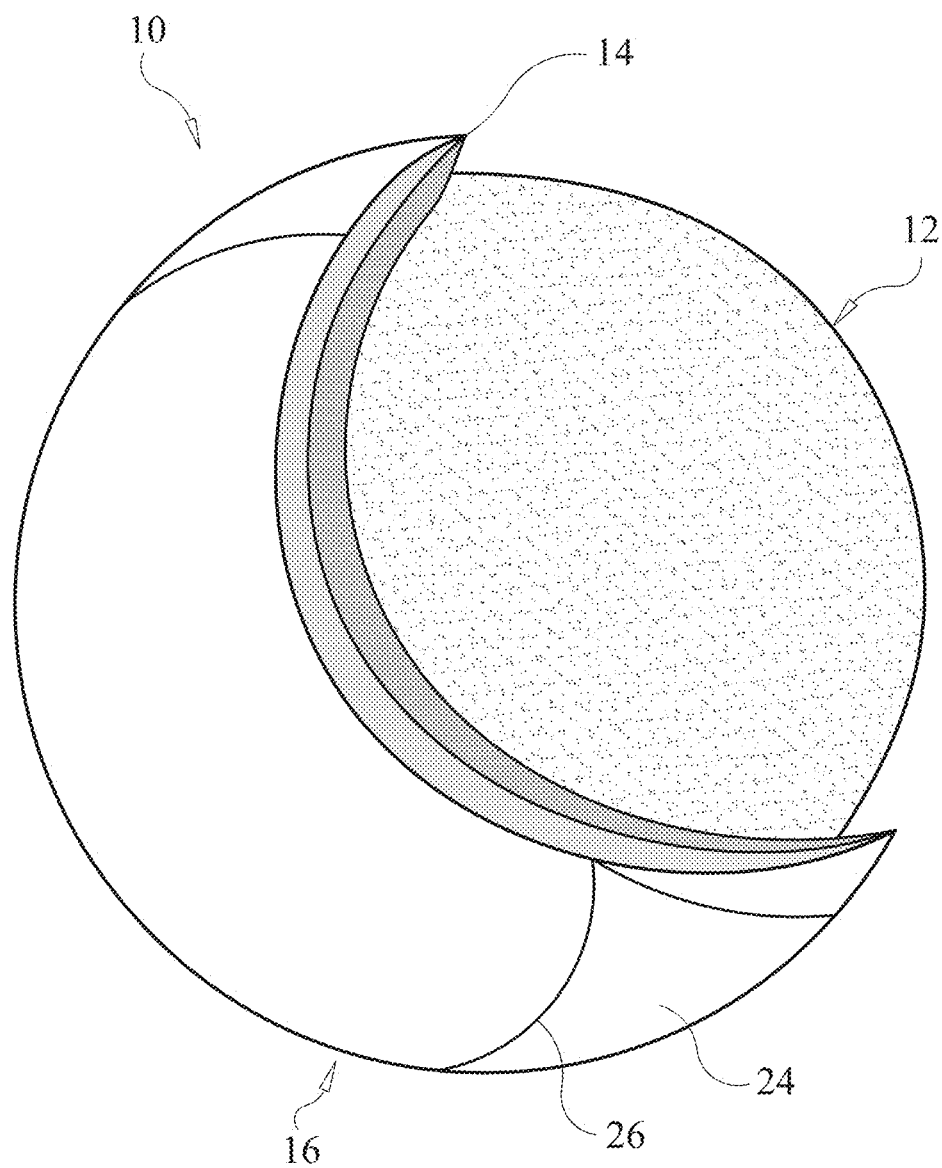
FIG. 2 is a plan view of the inflatable ball of FIG. 1 but with an outer layer of the inflatable ball partially broken away to show an inner bladder.

Referring initially to FIGS. 1 to 2, an inflatable ball 10 comprises an inner layer 12, an intermediate layer 14 and an outer layer 16. The inner layer 12 has a cavity C for storing air. The intermediate layer 14 is provided over the inner layer 12. In the illustrated embodiment, the intermediate layer 14 includes ethylene vinyl acetate (EVA), as will be further described below. The outer layer 16 is provided over the intermediate layer 14. In the illustrated embodiment, the outer layer 16 includes rubber, preferably vulcanized rubber as will be described below. In the inflated state, the inflatable ball 10 preferably has a size ranging from 45 centimeters to 85 centimeters. However, it is noted that the ball 10 can have any suitable size, shape and/or diameter. The inner, intermediate and outer layers 12, 14 and 16 are provided as flexible but durable layers that can contract and expand as the inflatable ball 10 moves between the inflated and deflated states.

Therefore, the inflatable ball 10 of the illustrated embodiment includes three layers. The inner layer 12 is highly expandable to be inflated. The intermediate layer 14 having EVA strengthens the inflatable ball 10 to keep the inflatable ball 10 from puncturing during animal engagement. The outer layer 16 includes rubber or other rough material to give the inflatable ball 10 an outer texture that is similar to a soccer ball or a volleyball to engage the animal. Therefore, the inflatable ball 10 is suitable for animal engagement that is provided to not be punctured easily.

Figure 4:
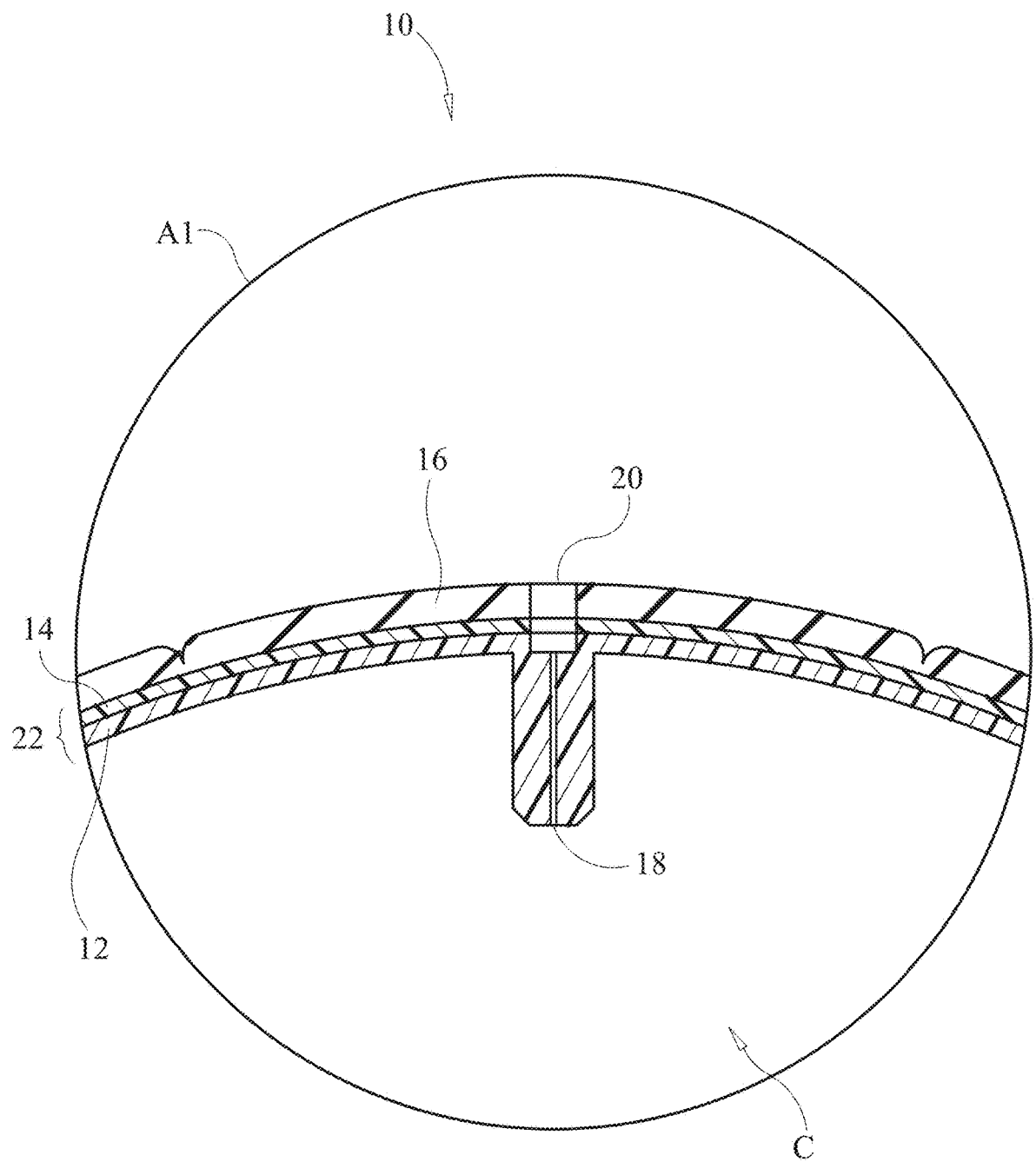
FIG. 4 is an enlarged view of a portion A1 of the cross-sectional view of FIG. 3.

As best seen in FIG. 4, the inflatable ball 10 includes a valve 18 for receiving a pump (not shown) to inflate the inflatable ball 10. The inflatable ball 10 also includes a plug 20 that is fitted over the valve 18 to close the valve 18 once the ball is inflated. As shown, the valve 18 extends through the inner, intermediate and outer lavers 12, 14 and 16 so that air can reach the cavity C from the pump. The ball can be inflated in any suitable manner with or without a pump.

As stated, the inner layer 12 forms the cavity C for containing the air. In the illustrated embodiment, the inner layer 12 is made of polyvinyl chloride (PVC). That is, the inner layer 12 can be made of soft plastic vinyl. The inner layer 12 can be made of a non-toxic PVC material with a thickness of about 1500 to 2000 micrometers. Preferably, the inner layer 12 is approximately 1800 micrometers. In this way, the inner layer 12 can be puncture resistant when a pet engages with the inflatable ball 10. The inner layer 12 can be made from the polymerization of vinyl chloride to form an unmodified PVC layer that can be inflated with air. The unmodified PVC layer is then applied with additives such as heat or ultraviolet (UV) stabilizers, and impact modifiers, and/or flame retardants.

With the inner layer 12 being made of PVC, the inflatable ball 10 can be considered "anti-burst" or "burst-resistant," meaning the inner layer 12 would deflate if punctured but not explode. In this way, the inflatable ball 10 can maintain its inflated shape not by the air pressure filled inside the bladder 22 but due to the rigidity and elasticity of the PVC. The inflatable ball 10 can withstand semi-permanent use without requiring much care. As stated, the inner layer 12 can be made of foamed PVC to have suitable flexibility. Therefore, the inflatable ball 10 can absorb impact and not cause injury to a pet during engagement.

Figure 3:
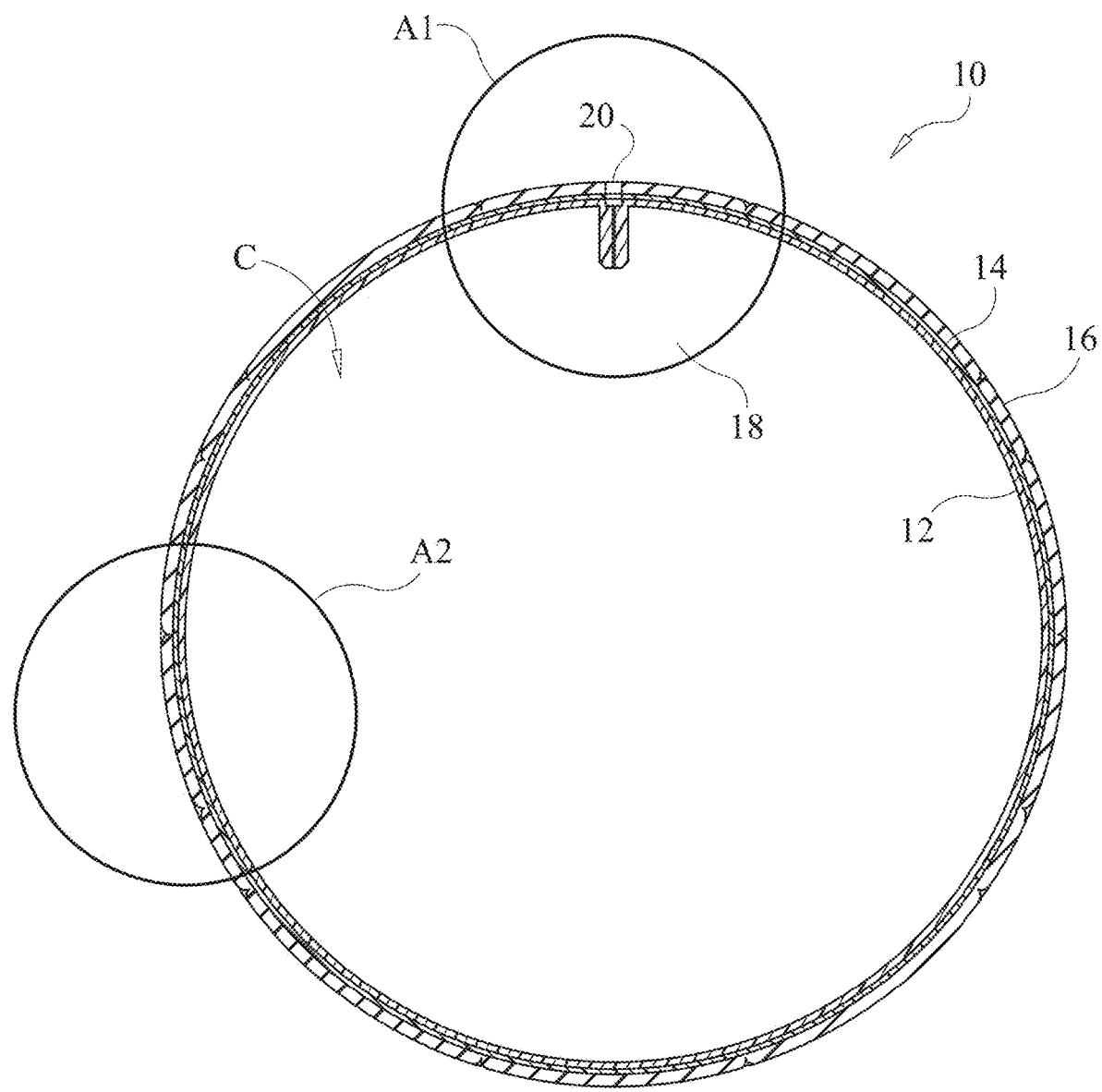
FIG. 3 is a cross-sectional view of the inflatable ball of FIG. 1.

As shown in FIG. 3, the inner layer 12 defines the cavity C that is a substantially spherical cavity C formed at the center of the inflatable ball 10. The inner layer 12 can be formed by applying a water-resistant film containing an acrylic resin onto a spherical mold that forms the cavity C.

The raw material for the foamed PVC can be kneaded into a paste that is charged onto the mold. The PVC can also be coated onto the mold by spray coating the surface of the mold.

Figure 5:
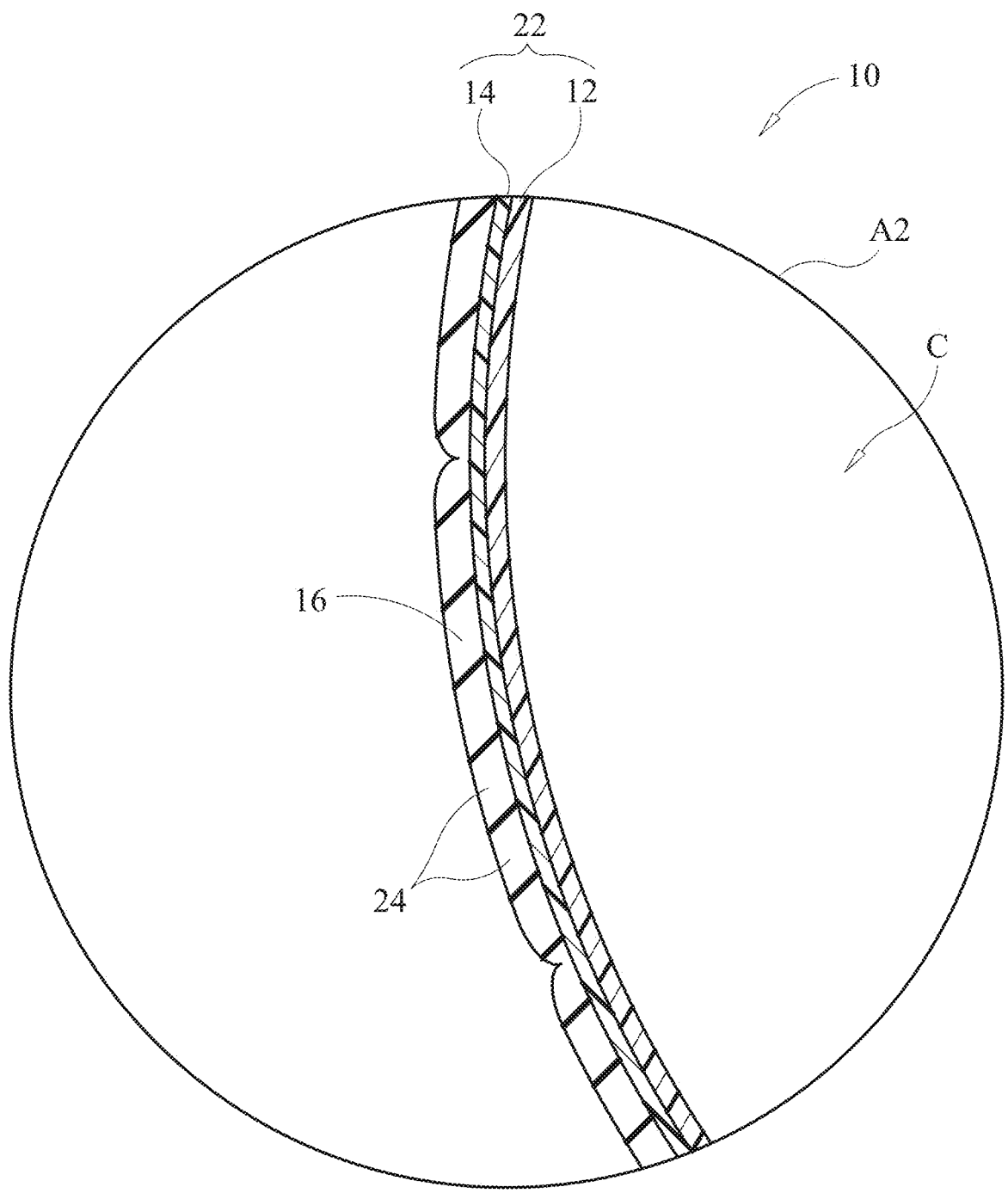
FIG. 5 is an enlarged view of a portion A2 of the cross-sectional view of FIG. 3.

Referring to FIGS. 2 to 4, the intermediate layer 14 is EVA or made from EVA. Therefore, the intermediate layer 14 can be made of a copolymer of ethylene and vinyl acetate. The intermediate layer 14 is therefore made of extremely elastic material that can be processed like other thermoplastics. The intermediate layer 14 also possesses physical qualities of low-temperature toughness, stress-crack and UV radiation resistance. The intermediate layer 14 with EVA can have a tensile strength of 3580 psi and a flexural modulus of elasticity of 2470 psi. The intermediate layer 14 can be provided over the inner layer 12 by spray painting EVA foam over the inner layer 12. Alternatively, the intermediate layer 14 can be injection molded onto the inner layer 12. As seen in FIGS. 3 to 5, the intermediate layer 14 is preferably thinner than the inner and outer layers 14 and 16. Therefore, the intermediate layer 14 is the thinnest layer.

In the illustrated embodiment, the intermediate layer 14 can be made of ethylene vinyl acetate copolymer, ethylene vinyl acetate/acid terpolymer, or mixtures of these, along with a crosslinking agent, crosslinking activator, crosslinking accelerator, co-crosslinking agent, or mixtures of these. The intermediate layer 14 can have vinyl acetate content between about 5% and about 60%. The intermediate layer 14 can also comprise of a blend polymer, which can include ionomeric polymers, nonionomeric polymers, or mixtures of these. The intermediate layer 14 can also include a cross-linking agent, activator, accelerator, co-crosslinking agent, or mixtures of these.

The intermediate layer 14 can include different types of EVA copolymers and EVA/acid terpolymers having widely varying physical properties based on their differing vinyl acetate content and molecular weight. These various combinations of vinyl acetate content and molecular weight provide for many different types of these polymers having very different processability, as well as other chemical, thermal, mechanical, and rheological properties. The intermediate layer 14 within the scope of the present invention includes ethylene vinyl acetate copolymers and/or ethylene vinyl acetate/acid terpolymers having a percentage content of vinyl acetate between about 5% and about 60%.

The intermediate layer 14 as applied over the inner layer 12 together forms the bladder 22 of the inflatable ball 10. In other words, the inner layer 12 and the intermediate layer 14 together defines the bladder 22, as seen in FIG. 2. It will be apparent to those skilled in the pet products field from this disclosure that the layers of the inner, intermediate and outer layers 12, 14 and 16 can vary depending on need or desire of the overall dimensions of the inflatable ball 10.

The outer layer 16 can comprise of a plurality of rubber panels 24 that are connected to give the inflatable ball 10 texture and grip. As stated, the outer layer 16 is made of rubber, preferably vulcanized rubber. Alternatively, the outer layer 16 can be made of synthetic leather, such as plastics or polyurethane that is water resistant. As shown in FIGS. 1 and 5, the outer layer 16 is provided as a plurality of rubber panels 24 that can be stitched together in a conventional manner.

When the rubber panels 24 are sewn together, the inflatable ball 10 is a near perfect sphere in the inflated state. However, it is noted that the ball can have any suitable "ball" shape, such as a football, rugby ball or other type of "sports" ball. The outer layer 16 can also include multiple layers of polyester lining or cotton blend lining which give the inflatable ball 10 strength, structure, and bounce. The rubber panels 24 of the outer layer 16 can be stitched with a 5-ply twisted polyester cord, machine-stitched or glued together. The rubber panels 24 are preferably cut into the desired shapes and sizes and pre-punched with holes for stitching 26. The stitching 26 is done by turning the ball inside out so none of the stitches show on the outside of the inflatable ball 10. The finished ball is reversed and the bladder 22 (i.e., the inner and intermediate layer 14s) is inserted and inflated to be sure the needle does not puncture the bladder 22. While the outer layer 16 is provided to give the inflatable ball 10 the appearance of a soccer ball. It will be apparent to those skilled in the pet products field from this disclosure that alternatively, the outer layer 16 can be provided to give the inflatable the outer appearance of a volleyball or other type of ball as needed and/or desired.

Figure 6:
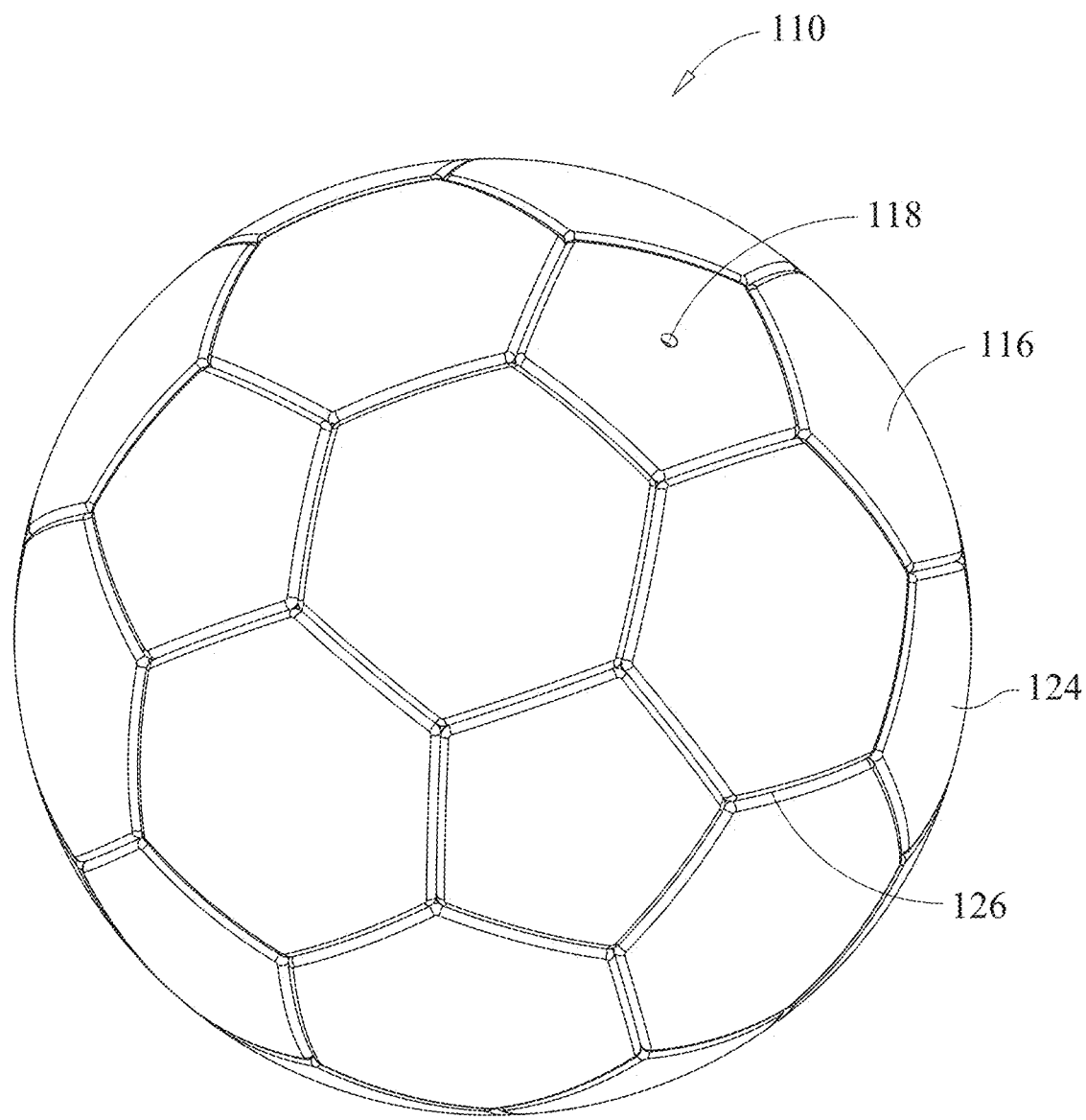
FIG. 6 is a plan view of an alternative inflatable ball having different outer rubber panels.

Referring to FIG. 6, a modified inflatable ball 110 is provided having a modified outer layer 116. The modified inflatable ball 110 is identical with the inflatable 10 and has an inner layer and an intermediate layer that are identical to the inner layer 12 and the intermediate layer 14 of the inflatable ball 10. The modified inflatable ball 110 includes a modified valve 118 that extends through the modified outer layer 116 towards the cavity of the modified inflatable ball 110. The modified outer layer 116 is also preferably made of vulcanized rubber as the outer layer 16. However, the modified outer layer 116 includes a plurality of modified panels 124. As shown in FIGS. 1 and 5, the outer layer 16 is provided as a plurality of rubber panels 124 that that are stitched together to give the inflatable ball 110 the outer appearance of a soccer ball. Therefore, the rubber panels 124 are provided as hexagons that are stitched or glued together. It will be apparent to those skilled in the pet products field from this disclosure that the panels 24 and 124 can be provided in various shapes, sizes and dimensions to give the inflatable ball 10 and the modified inflatable ball 110 varying appearances.

In understanding the scope of the present invention, the term "comprising" and its derivatives, as used herein, are intended to be open ended terms that specify the presence of the stated features, elements, components and/or groups, but do not exclude the presence of other unstated features, elements, components and/or groups. The foregoing also applies to words having similar meanings such as the terms, "including", "having" and their derivatives. Also, the terms "part." "section." "portion." "member" or "element" when used in the singular can have the dual meaning of a single part or a plurality of parts.

The term "configured" as used herein to describe a component, section or part of a device includes that is constructed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An inflatable pet toy comprising:
    an inner layer made of polyvinyl chloride and forming an inflatable bladder for storing air, the inner layer configured to resist bursting during engagement with a pet;
    an intermediate layer arranged to contact the inner layer, the intermediate layer including ethylene vinyl acetate foam sprayed over the inner layer; and
    an outer layer arranged to contact the intermediate layer.

2. The inflatable pet toy according to claim 1, wherein the outer layer includes rubber.

3. The inflatable pet toy according to claim 1, wherein the inflatable pet toy has a size ranging from 55 centimeters to 85 centimeters when in an inflated state.

4. The inflatable pet toy according to claim 1, wherein the inner layer has a first thickness ranging from 1500 to 2000 micrometers, the intermediate layer has a second thickness and the outer layer has a third thickness, the second thickness being less than the first thickness and the third thickness.

5. The inflatable pet toy according to claim 1, wherein the outer layer includes a plurality of rubber panels that are stitched together.

6. The inflatable pet toy according to claim 1, wherein the inner layer contacts the stored air.

7. The inflatable pet toy according to claim 1, wherein the outer layer contacts the intermediate layer.

8. The inflatable pet toy according to claim 1, wherein the inner layer has a first thickness ranging from 1500 to 2000 micrometers, the intermediate layer has a second thickness and the outer layer has a third thickness, the second thickness being less than the first thickness.

9. The inflatable pet toy according to claim 1, wherein the inner layer has a first thickness ranging from 1500 to 2000 micrometers, the intermediate layer has a second thickness and the outer layer has a third thickness, the second thickness being less than the third thickness.

10. The inflatable pet toy according to claim 1, wherein the intermediate layer completely encircles the inner layer.

11. A method for making an inflatable pet toy, the method comprising:
    forming an inner layer of polyvinyl chloride into an inflatable bladder for storing air, the inner layer configured to resist bursting during engagement with a pet;
    spraying an ethylene vinyl acetate foam over the inner layer to form an intermediate layer, the intermediate layer arranged to contact the inner layer; and
    forming an outer layer, the outer layer arranged to contact the intermediate layer.

12. The method of claim 11, wherein the outer layer includes rubber.

13. The method of claim 11, wherein the inflatable pet toy has a size ranging from 55 centimeters to 85 centimeters when in an inflated state.

14. The method of claim 11, comprising:
    forming the inner layer to have a first thickness ranging from 1500 to 2000 micrometers,
    forming the intermediate layer to have a second thickness, and
    forming the outer layer to have a third thickness, the second thickness being less than the first thickness.

15. The method of claim 11, comprising:
    forming the inner layer to have a first thickness ranging from 1500 to 2000 micrometers,
    forming the intermediate layer to have a second thickness, and
    forming the outer layer to have a third thickness, the second thickness being less than the third thickness.

16. The method of claim 11, comprising:
    forming the outer layer over the intermediate layer so that the outer layer contacts the intermediate layer.

17. The method of claim 11, comprising:
    forming the intermediate layer such that the intermediate layer completely encircles the inner layer.

18. The method of claim 11, wherein the intermediate layer has a uniform thickness, and the intermediate layer completely encircles the inner layer.

19. The inflatable pet toy according to claim 1, wherein the intermediate layer has a uniform thickness, and the intermediate layer completely encircles the inner layer.

* * * * *